United States Patent [19]

Heynisch et al.

[11] Patent Number: 4,756,001
[45] Date of Patent: Jul. 5, 1988

[54] GAS DISCHARGE TUBE FOR AN ION LASER

[75] Inventors: Hinrich Heynisch, Graefelfing; Klemens Hübner, Ottobrunn; Erwin Hübner, Grafing; Hans Krueger, Munich; Hans Golser, Munich, all of Fed. Rep. of Germany

[73] Assignee: Siemens Aktiengesellschaft, Berlin and Munich, Fed. Rep. of Germany

[21] Appl. No.: 898,120

[22] Filed: Aug. 20, 1986

[30] Foreign Application Priority Data

Sep. 30, 1985 [DE] Fed. Rep. of Germany ....... 3534925

[51] Int. Cl.$^4$ .............................................. H01S 3/03
[52] U.S. Cl. ......................................... 372/61; 372/34
[58] Field of Search ....................... 372/34, 35, 61, 65

[56] References Cited

U.S. PATENT DOCUMENTS

| | | |
|---|---|---|
| 3,437,950 | 4/1969 | Okaya et al. ........................... 372/35 |
| 3,528,206 | 9/1970 | Baird ..................................... 372/29 |
| 3,554,275 | 2/1969 | Schade, Jr. ............................ 372/34 |
| 3,753,144 | 8/1973 | Kearns et al. . | |
| 3,763,442 | 10/1973 | McMahan ............................. 372/34 |
| 4,481,633 | 11/1984 | McMahan ............................. 372/34 |
| 4,625,317 | 11/1986 | Kolb et al. ............................ 372/34 |
| 4,679,202 | 7/1987 | Maloney et al. ...................... 372/34 |

Primary Examiner—Léon Scott, Jr.
Attorney, Agent, or Firm—Hill, Van Santen, Steadman & Simpson

[57] ABSTRACT

In an ion laser having a discharge channel extending through a ceramic tube, a coil of thermal conductive material is placed around the ceramic tube and the tube and coil combination are inserted into a bore of a heat eliminating device. The tube, coil, and heat eliminating device are soldered to one another so as to provide clearance between individual turns of the coil, thereby providing good cooling characteristics and enhanced power of the laser without risk of breakage of the ceramic tube.

11 Claims, 2 Drawing Sheets

GAS DISCHARGE TUBE FOR AN ION LASER

BACKGROUND OF THE INVENTION

1. Field of the Invention

The present invention relates generally to a gas discharge tube having a discharge channel for use with an ion laser and, more specifically, to a heat transmitting element for the discharge tube.

2. Description of the Prior Art

A gas discharge tube is disclosed in U.S. Pat. No. 3,753,144. As shown, the ceramic tube is immersed into a liquid which transmits heat to a heat eliminating means in the form of a hollow cylinder surrounded by cooling disks. A pressure vessel is required since the liquid evaporates and precipitates onto the walls for the heat transfer. There is a risk with the disclosed device that the liquid will evaporate sufficiently in an overload situation for the ceramic tube to become at least partially above the fluid level and will, thus, become hotter in this region than in the region effected by the liquid. This can lead to sagging and destruction of the ceramic tube.

SUMMARY OF THE PRESENT INVENTION

An object of the present invention is to provide a simple and reliable structure for a gas discharge tube for use with ion lasers, such as, for example, argon lasers having a power of a few hundred milliwatts. These and other objects of the present invention are provided by a ceramic tube encircled by a coil of ductile material, around which is mounted a heat eliminating means. Free spaces between individual turns of the coil are thus defined between the ceramic tube and the heat eliminating device.

The coil is composed of a ductile material having good thermal conductivity which guarantees, first, a good heat transmission between the ceramic tube and the heat eliminating means. Secondly, the coil is deformable and, thus, suitable to compensate for dislocations between portions of the ceramic tube and the heat eliminating means such as are attributable to different thermal expansion as a result of temperature changes.

A copper rod having the required bore is used as the heat eliminating means in one example. Cooling disks of copper are soldered or welded to the copper rod for air cooling. A ceramic tube having an inside diameter corresponding to the diameter of the discharge channel and formed with thin walls is wrapped by the ductile coil and then inserted into the heat eliminating device. The walls of the ceramic tube should be thin enough to just guarantee adequate stability for handling during assembly. As soon as the ceramic tube is mounted into the cooling member, it is held in a radial direction by the cooling member and, thus, need not have any stability with respect to bending stresses and the like.

Since the ceramic tube is be formed with an extremely thin wall, relatively inexpensive $Al_2O_3$ ceramic is used, even though it has a far lower thermal conductivity than materials, such as BeO as disclosed in U.S. Pat. No. 3,753,144.

In one embodiment, the ceramic tube has an inside diameter of approximately 1 mm and an outside diameter of approximately 3 mm. The ceramic tube is surrounded by a copper wire of approximately 0.75 mm diameter which is coated with a layer of standard hard solder, such as silver solder containing nickel. The ceramic tube is soldered to the coil and to the heat eliminating device without the addition of further solder. As a result of this type of soldering, the clearances between the individual turns of the coil are not filled-in with solder so that there is a possibility for movement and expansion in the direction of the axis of the ceramic tube.

Since high demands are placed on precision and quality of heat transmission, it is preferable that the ceramic tube be trimmed to the required outside diameter and then coated with the solder and soldered into the corresponding bore of the heat eliminating means.

For a coil wire diameter of 0.75 mm, a pitch in the turns of the spiral coil of approximately 1 mm is sufficient to guarantee clearance between the individual turns when soldered. Since the solid heat eliminating device is highly stable and has only extremely slight dimensional changes, another advantage of the present invention is to mount the electrodes and resonator mirror for the laser to the discharge tube structure.

The present invention also specifies a method for manufacturing a discharge tube wherein the coil is first soldered to the ceramic tube, it is subsequently turned or ground for correcting the outside diameter, it is provided with a layer of silver solder having a thickness of approximately 20 μm, the silver solder preferably having nickel as an ingredient, and finally, the tube and coil unit is inserted into the corresponding bore of the heat eliminating device and soldered to the heat eliminating device by heating without requiring additional solder.

When less stringent demands are made for heat elimination, such as for lower power lasers, the discharge tube can be manufactured by rendering it solderable, introducing it together with a coil into the heat eliminating device, and soldering the three parts to one another in a single work step.

DESCRIPTION OF THE PREFERRED EMBODIMENTS

Figure 1:
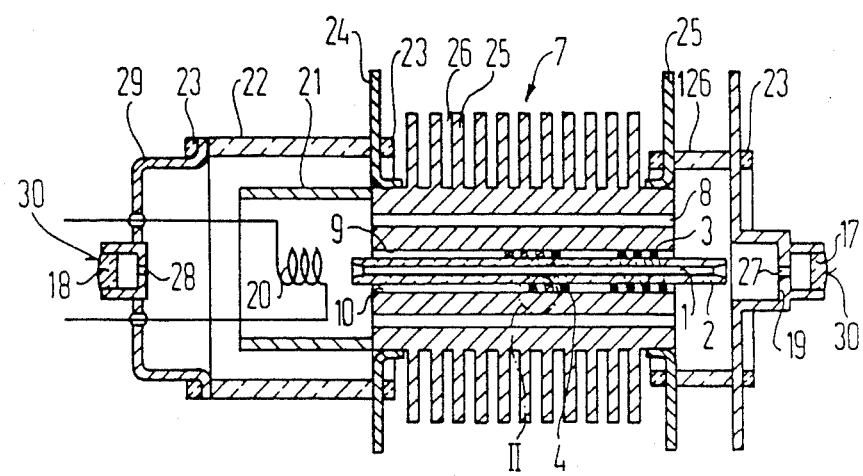
FIG. 1 is a longitudinal cross-section of a discharge tube according to the principles of the present invention and including attached electrodes and mirrors.
Figure 2:
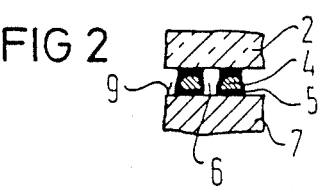
FIG. 2 is an enlarged fragmentary portion from the region II of FIG. 1 showing the coil spacing.

An ion laser, such as an argon ion laser, is shown in FIG. 1 including a discharge channel 1 extending along the interior of a ceramic tube 2. The ceramic tube 2 is disposed in a bore 10 of a heat eliminating device 7 and is wrapped with either a coil 3 or a coil 4 at least in the region of the bore 10. The distinction between the coil 3 and the coil 4 lies in their manufacture and will be described hereinafter. The coil 3 or 4 is soldered to both the ceramic tube 2, as well as to an inside cylinder wall 9 of the bore 10 to provide a mechanically rigid and thermally conductive connection. The soldering is such that a helical clearance 6 which is free of solid material is provided between individual turns of the coils 3 or 4, as shown in FIG. 2. A gas return channel is also shown.

The preferred coils 3 or 4 have a greatest cross-sectional dimension of approximately 0.75 mm and a pitch of the coil turns of about 1 mm. Such dimensioning enables the coil 3 or 4 to absorb length changes arising as a consequence of temperature fluctuations during assembly and operation, particularly when the coil 3 or 4 is formed of ductile material, such as copper or copper alloys.

For purposes of simplicity, both coil 3 and coil 4 are shown in FIG. 1, although each would ordinarily be provided in distinct discharge tubes. In many instances, the manufacturing precision obtainable with a ceramic tube 2 and a coil 3 having a circular cross-section is adequate for the requisite thermal contact therebetween. For especially high demand situations, however, an advantage is realized in using the coil 4 wherein the coil 4 on the tube 2 is trimmed to the required overall diameter and is provided with a solder layer before being inserted into the bore 10. The resulting shape of the coil 4 can be seen in FIG. 2.

A solder layer having a thickness of 20 µm is sufficient for a reliable connection of the coils 3 and 4 between the ceramic tube 2 and the cylinder wall 9. By using such solder layer thickness, the clearances 6 between the coil turns is not bridged or closed. A particularly suitable solder for the present invention is a silver solder containing nickel, especially a eutectic solder.

The heat eliminating device 7 is integrally connected to cooling disks 25. As shown in FIG. 1, the cooling disks are formed by sawing or milling slots 26 in a solid structure. The illustrated embodiment is especially well-suited for discharge tubes having small dimensions, for example, where an outside diameter of the cooling disks is 30 mm.

Fastening flanges 24 and 25 fix the position of the discharge tube in an air channel (not shown) which supplies a flow of cooling air. The fastening flanges 24 and 25 also provide a fastening for the electrodes and mirrors of the laser. An anode 19 is connected to the connecting flange 25 in a mechanically rigid and vacuum-tight fashion by a ceramic tube 126. The anode 19 projects beyond the ceramic tube 126 in a radial direction to provide adequate cooling. A passage 27 is arranged coaxially of the discharge channel through the anode 19 for passage of the laser emission to a mirror 17. The mirror 17 is connected to the anode 19 in a mechanically rigid fashion and includes a planar surface facing the laser beam and an arced, mirrored surface 30 at a side facing away from the laser beam so as to have a focusing effect.

A tungsten coil 20 through which the laser beam passes and which is arranged coaxially of the discharge channel serves as a cathode. The laser beam passes through the cathode 20 onto a mirror 18, passing through an opening 28 of a closing cap 29, which is likewise coaxial of the discharge channel 1. Like the mirror 17, the mirror 18 includes a planar surface which faces the laser beam and a convex, mirrored or partially mirrored outer surface 30 which faces away from the discharge channel 1. The closing cap 29 is soldered to a connecting flange 24 of the heat eliminating device 7 via a ceramic tube 22. The tungsten coil 20 is surrounded by a shielding tube 21 which prevents metal from sputtering onto the ceramic tube 22.

All metal-to-ceramic solder connections are executed in an especially stable fashion in a known way by placing and simultaneously soldering rings 23 of ceramic on the surfaces of the corresponding metal parts 19, 24, 25, and 29 opposite the solder connections to the ceramic tube 22 or 126. Fracturing of the solder locations as a consequence of thermal stresses is thereby prevented.

Figure 3:
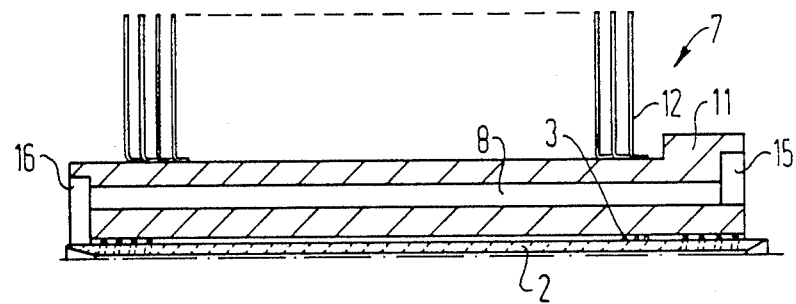
FIG. 3 is a partial longitudinal cross-section of another embodiment of the present invention.
Figure 4:
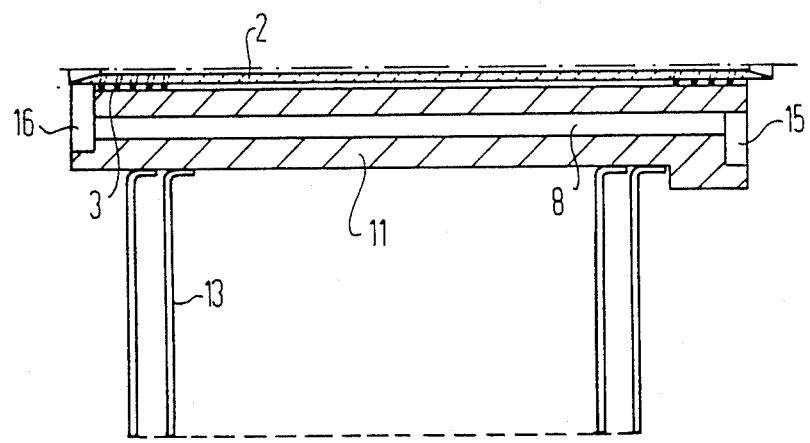
FIG. 4 is a partial longitudinal cross-section of yet another embodiment of the present invention.

A pair of exemplary embodiments are shown in FIGS. 3 and 4 and include heat eliminating devices each formed of a copper rod 11 and cooling disks 12 or 13, respectively. The embodiments of FIGS. 3 and 4 are especially well-suited for discharge tubes having large dimensions. Either the embodiment of FIG. 3 or the embodiment of FIG. 4 can be used depending on the flow rate of the cooling air, FIG. 3 illustrating cooling disks 12 having a small diameter and slight spacing therebetween and FIG. 4 illustrating cooling disks 13 having a larger diameter and a greater spacing from one another. Rigid connections of the discharge tube to the remaining portions (not shown) of the laser are made at recesses 15 and 16.

It is preferred to form the ceramic tube 2 of $Al_2O_3$ since such ceramic is relatively inexpensive and has an adequate thermal conductivity for the thin walls which are possible as a result of the present invention. In contrast to BeO which has considerably better thermal conductivity, $Al_2O_3$ is non-toxic, thus, representing another advantage for its use.

For smaller discharge tubes and less restrictive mechanical stability demands of the tubes, the retaining flanges 24 and 25, the anode 19, and the retaining cap 29 are formed of copper. Where greater mechanical stresses are involved, it is preferable to use nickel-iron alloys having a temperature coefficient matched to that of the ceramic.

Although modifications and changes may be suggested by those skilled in the art, it is the intention of the inventors to embody within the patent warranted hereon all changes and modifications as reasonably and properly come within the scope of their contribution to the art.

We claim as our invention:

1. A gas discharge tube for an ion laser, said gas discharge tube having a discharge channel disposed in a ceramic tube, comprising:
   a heat transmission element formed of a coil of ductile material having good thermal conductivity, said coil of said heat transmission element embracing said ceramic tube;
   a heat eliminating device having a first bore, said first bore having a substantially cylindrical wall;
   said coil being connected to said ceramic tube and to said cylindrical wall of said first bore in a mechanically rigid and thermally conductive fasion,
      said coil includes one or more clearances free of solid substances between neighboring individual turns of said coil; and
   said heat eliminating device including at least one further bore as a channel for gas return.

2. A gas discharge tube as claimed in claim 1, wherein said heat eliminating device is a copper rod and copper cooling disks soldered to said copper rod, said copper rod having said first bore and said at least one further bore extending therethrough, and
   wherein said ceramic tube has an inside diameter matched to said discharge channel and has a small wall thickness yet mechnical stability sufficient to withstand handling during assembly of said gas discharge tube.

3. A gas discharge tube as claimed in claim 1, wherein said ceramic tube consists essentially of $Al_2O_3$ ceramic.

4. A gas discharge tube as claimed in claim 1,
   wherein said ceramic tube has an inside diameter of approximately 1 mm and an outside diameter of approximately 3 mm;

wherein said coil is formed of a copper wire having a diameter of approximately 0.75 mm and is surrounded with a layer of silver solder; and wherein said ceramic tube is soldered to said coil and to said heat eliminating means without the addition of further solder.

5. A gas discharge tube as claimed in claim 4, wherein said coil on said ceramic tube is trimmed to a predetermined outside diameter to fit into said cylindrical wall of said first bore, and further comprising:

a coating of solder over said cermic tube and said coil, said ceramic tube being soldered into said first bore.

6. A gas discharge tube as claimed in claim 4, wherein the pitch of the turns of the coil is approximately 1 mm.

7. A gas discharge tube as claimed in claim 1, further comprising:

electrodes and resonator mirrors of said ion laser mounted to said discharge tube.

8. A gas discharge tube as claimed in claim 7, wherein outside surfaces of said coil are machined to match an inside dimension of said bore.

9. A method for manufacturing a discharge tube for a laser, comprising the steps of:

soldering a coil to a ceramic tube, grinding said ceramic tube and coil to a predetermined outside diameter, applying a layer of silver solder of approximately 20 $\mu$m thickness to said outside diameter, inserting said ceramic tube and coil into a bore in a heat eliminating device, and soldering said ceramic tube to said heat eliminating device by applying heat without supplying further solder.

10. A method as claimed in claim 9, further comprising the steps of:

rendering said ceramic tube solderable, and soldering said ceramic tube, said coil and said heat eliminating device to one another in a single step.

11. A gas discharge tube for use in an ion laser, comprising:

an elongated ceramic tube having thin walls around a substantially centrally disposed longitudinally extending discharge channel;

a helically wound coil of heat transmissive ductile material embracing an outside surface of said ceramic tube in thermally transmissive fashion substantially along a length of said ceramic tube, said helically wound coil forming neighboring turns, said coil having spaces between said neighboring turns free of solid material;

a heat eliminating device having a bore, said ceramic tube and said coil being disposed within and extending along said bore, said coil being connected to an inside wall surface of said bore in thermally transmissive fashion so that heat is conducted from said ceramic tube through said coil and to said heat eliminating device.

* * * * *